United States Patent
Shinohara (10) Patent No.: US 7,039,191 B2
(45) Date of Patent: May 2, 2006

(54) CHAINING KEY BROADCASTING RECEPTION SYSTEM AND CHAINING KEY BROADCASTING RECEPTION METHOD

(75) Inventor: Katsuya Shinohara, Tokyo (JP)

(73) Assignee: NEC Corporation, Tokyo (JP)

( * ) Notice: Subject to any disclaimer, the term of this patent is extended or adjusted under 35 U.S.C. 154(b) by 667 days.

(21) Appl. No.: 09/988,597

(22) Filed: Nov. 20, 2001

(65) Prior Publication Data

US 2002/0061108 A1     May 23, 2002

(30) Foreign Application Priority Data

Nov. 22, 2000 (JP) .............................. 2000-355123

(51) Int. Cl.
*H04L 9/00* (2006.01)
(52) U.S. Cl. ...................... 380/277; 380/228; 380/278; 380/279; 380/281; 713/157
(58) Field of Classification Search ................ 380/239, 380/200–203, 210, 223, 228–229, 277–283; 713/157

See application file for complete search history.

(56) References Cited

U.S. PATENT DOCUMENTS 5,915,018 A * 6/1999 Aucsmith .................... 380/201

6,157,719 A * 12/2000 Wasilewski et al. ........ 380/210
6,219,422 B1 * 4/2001 Sato ............................ 380/240

FOREIGN PATENT DOCUMENTS

| JP | 10-164550 | 6/1998 |
|---|---|---|
| JP | 11-112950 | 4/1999 |
| JP | 2001-338212 | 12/2001 |
| JP | 2002-034007 | 1/2002 |
| JP | 2002-057637 | 2/2002 |
| JP | 2002-116976 | 4/2002 |

* cited by examiner

*Primary Examiner*—Hosuk Song
*Assistant Examiner*—Ponnoreay Pich
(74) *Attorney, Agent, or Firm*—Young & Thompson (57) ABSTRACT

In the chaining key broadcasting reception system, a chaining key reception unit receives a chaining key, an identifier of the key in question and a target key identifier indicative of a chaining key to be decoded by the key in question; a chaining key management unit takes out an already stored chaining key by using the target key identifier received by the chaining key reception unit; and a chaining key decoding unit decodes the chaining key received by the chaining key reception unit by using the chaining key sent from the chaining key management unit to generate a new chaining key.

8 Claims, 6 Drawing Sheets

CHAINING KEY BROADCASTING RECEPTION SYSTEM AND CHAINING KEY BROADCASTING RECEPTION METHOD

BACKGROUND OF THE INVENTION

1. Field of the Invention

The present invention relates to a chaining key broadcasting reception system and a chaining key broadcasting reception method and, more particularly, to a method of receiving scrambled broadcasts in digital broadcasts to be descrambled using a cipher key.

2. Description of the Related Art

Some of conventional key broadcasting systems use a CAS (Conditional Access System) card for receiving and decoding a cipher key for use in descrambling scrambled broadcasts in digital broadcasts.

Figure 6:
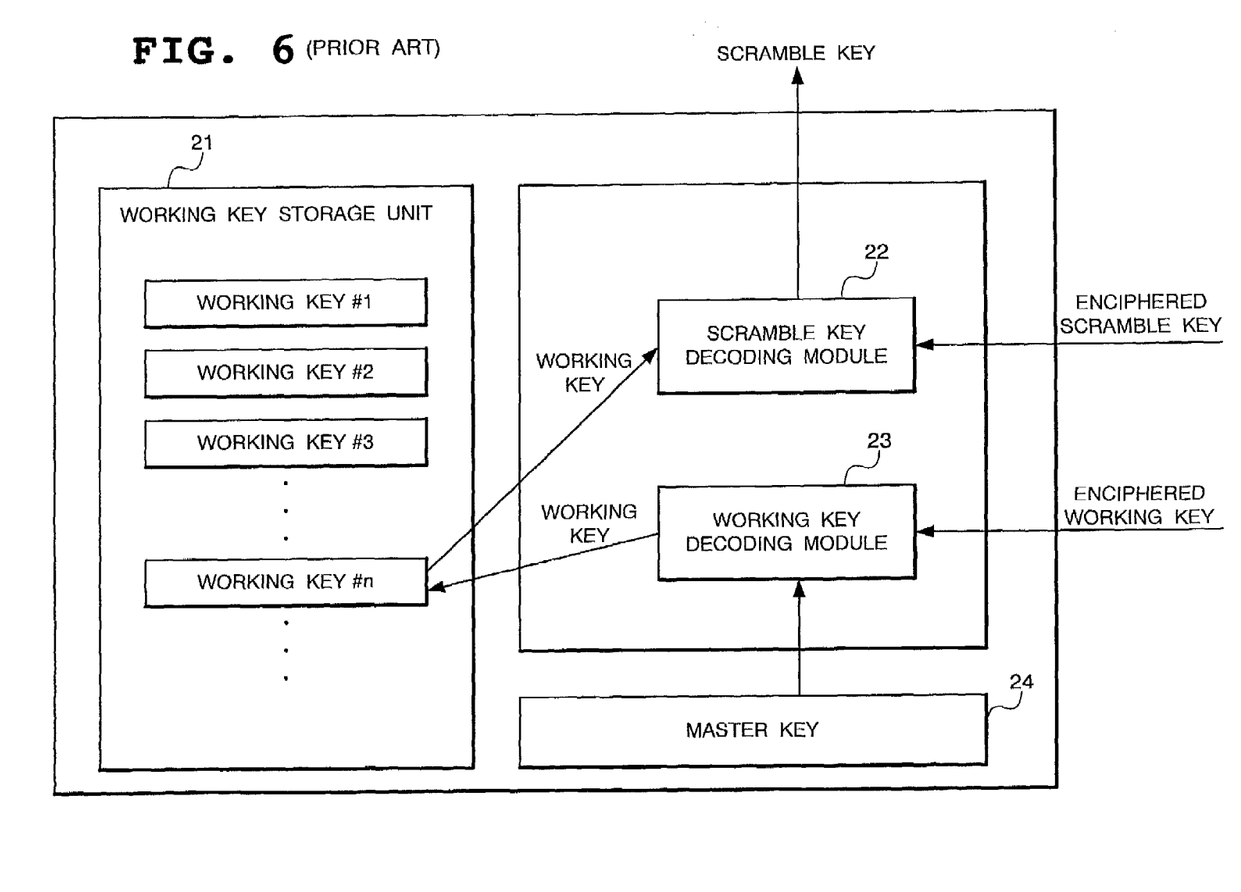
FIG. 6 is a block diagram showing a structure of a conventional key broadcasting system.

In the processing of a CAS card, as shown in FIG. 6, a working key decoding module 23 decodes an enciphered working key which is broadcast prior to a program by using a master key 24 in the CAS card and stores the decoded key in a working key storage unit 21.

A scramble key decoding module 22 decodes an enciphered scramble key which is broadcast simultaneously with a program by using a working key stored in the working key storage unit 21 and outputs the decoded key to the outside of the card. Although not shown in the figure, outside the CAS card, scrambled program picture is displayed after being decoded using the scramble key.

Because in the above-described conventional key broadcasting system, one program every time uses the same working key for decoding a scramble key, once the working key is obtained in advance, a viewer is allowed to generate a scramble key whether he or she starts viewing a program halfway in its broadcast, or he or she temporarily stops viewing the program halfway, so that it is not possible to provide such service as allowing only a viewer who has viewed a program from the beginning to the end to use the key.

Another problem is that since when an enciphered scramble key is received, a decoded scramble key is output, reception of an enciphered scramble key and use of a decoded scramble key can not be conducted asynchronously.

A further problem is that since storage of a working key and output of a scramble key are completely different processings, a decoded scramble key can not be used as a working key for use in the decoding of scramble keys to follow.

SUMMARY OF THE INVENTION

An object of the present invention is to solve the above-described problems and provide a chaining key broadcasting system and a chaining key broadcasting method which realize processing using a decoded key for the decoding to follow.

According to one aspect of the invention, a chaining key broadcasting reception system for receiving digital broadcasts, comprises means for obtaining key information for the decoding of the contents enciphered in advance based on key information which is obtained when a plurality of programs in the digital broadcasts are viewed.

In the preferred construction, the key information obtaining means includes chaining key reception means for receiving a chaining key for decoding the contents, an identifier of the key in question and a target key identifier indicative of a chaining key to be decoded by the key in question, chaining key management means for taking out an already stored chaining key by using the target key identifier, and chaining key decoding means for decoding the chaining key received by the chaining key reception means by using the chaining key sent from the chaining key management means to generate a new chaining key.

In another preferred construction, the chaining key broadcasting reception system is structured to independently execute a series of processing of receiving, decoding and storing the chaining key and processing using the chaining key, wherein the processing using the chaining key is an enciphered contents decoding process.

In another preferred construction, the chaining key broadcasting reception system is structured to independently execute a series of processing of receiving, decoding and storing the chaining key and processing using the chaining key, wherein the processing using the chaining key is enciphered contents decoding processing.

In another preferred construction, an identifier of an arbitrary chaining key is designated as the target identifier.

According to another aspect of the invention, a chaining key broadcasting reception method of receiving digital broadcast, comprising the step of obtaining key information for the decoding of contents enciphered in advance based on key information which is obtained when a plurality of programs in the digital broadcasts are viewed.

In the preferred construction, the key information obtaining step includes the steps of receiving a chaining key for decoding the contents, an identifier of the key in question and a target key identifier indicative of a chaining key to be decoded by the key in question, taking out an already stored chaining key by using the target key identifier, and decoding the received chaining key by using the taken out chaining key to generate a new chaining key.

In another preferred construction, a series of processes of receiving, decoding and storing the chaining key is executed independently of other processing using the chaining key.

In another preferred construction, a series of processes of receiving, decoding and storing the chaining key and processing using the chaining key are executed independently, and the processing using the chaining key is enciphered contents decoding processing.

In another preferred construction, an identifier of an arbitrary chaining key is designated as the target identifier.

According to a further aspect of the invention, a chaining key broadcasting reception system for receiving digital broadcasting, comprises key information obtaining unit which obtains key information for the decoding of the contents enciphered in advance based on key information which is obtained when a plurality of programs in the digital broadcasting are viewed.

More specifically, the chaining key broadcasting system of the present invention is characterized in allowing a key for solving enciphered contents to be obtained through viewing of a plurality of programs at a device for receiving broadcasting.

Adopting such a structure as described above realizes an arrangement which enables a final chaining key to be decoded only when a series of chaining keys are all received and accordingly enables a broadcasting provider to provide such service as allowing only a viewer who has viewed a program supplied by the provider itself from the beginning to the end or only a viewer who has thoroughly viewed a serial program supplied by a broadcasting station of the provider itself. Realized, for example, is the service of allowing those who have viewed a program A and a program B to obtain a chaining key B and those who have viewed the program A and a program C to obtain a chaining key C.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

In FIG. 2, the chaining key broadcasting system according to the present embodiment of the present invention includes a demux 11, a picture decoder 12, a picture monitor 13, a chaining key handler 14, a chaining key decoding module 15, a chaining key management module 16, a content decoding module 17, a chaining key memory 18 and a hard disc 19.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in order to keep the disclosure concise and focus on the present invention.

Figure 1:
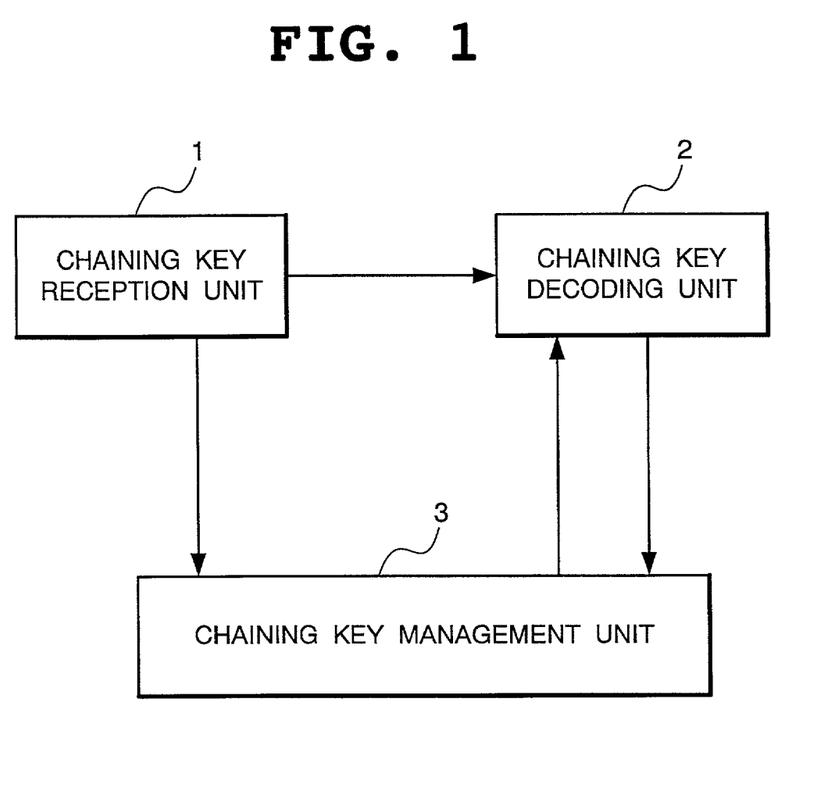
FIG. 1 is a block diagram showing the entire structure of a chaining key broadcasting system of the present invention.

FIG. 1 is a block diagram showing the entire structure of a chaining key broadcasting system according to the present invention. In FIG. 1, the chaining key broadcasting system of the present invention includes a chaining key reception unit 1, a chaining key decoding unit 2 and a chaining key management unit 3.

The chaining key reception unit 1 receives a chaining key, a key identifier of the same and a target key identifier indicative of a chaining key to be decoded by the key in question. The chaining key management unit 3 takes out an already stored chaining key by using the target key identifier received at the chaining key reception unit 1. The chaining key decoding unit 2 decodes the chaining key received by the chaining key reception unit 1 by using the chaining key sent from the chaining key management unit 3 to generate a new chaining key.

This realizes a system which fails to allow a final chaining key to be decoded unless a series of chaining keys are all received, thereby enabling a broadcasting provider to provide such service as giving only a viewer who has viewed a program supplied by the provider itself from the beginning to the end or a viewer who has thoroughly viewed a serial program supplied by a broadcasting station of the provider itself to obtain a final chaining key.

Figure 2:
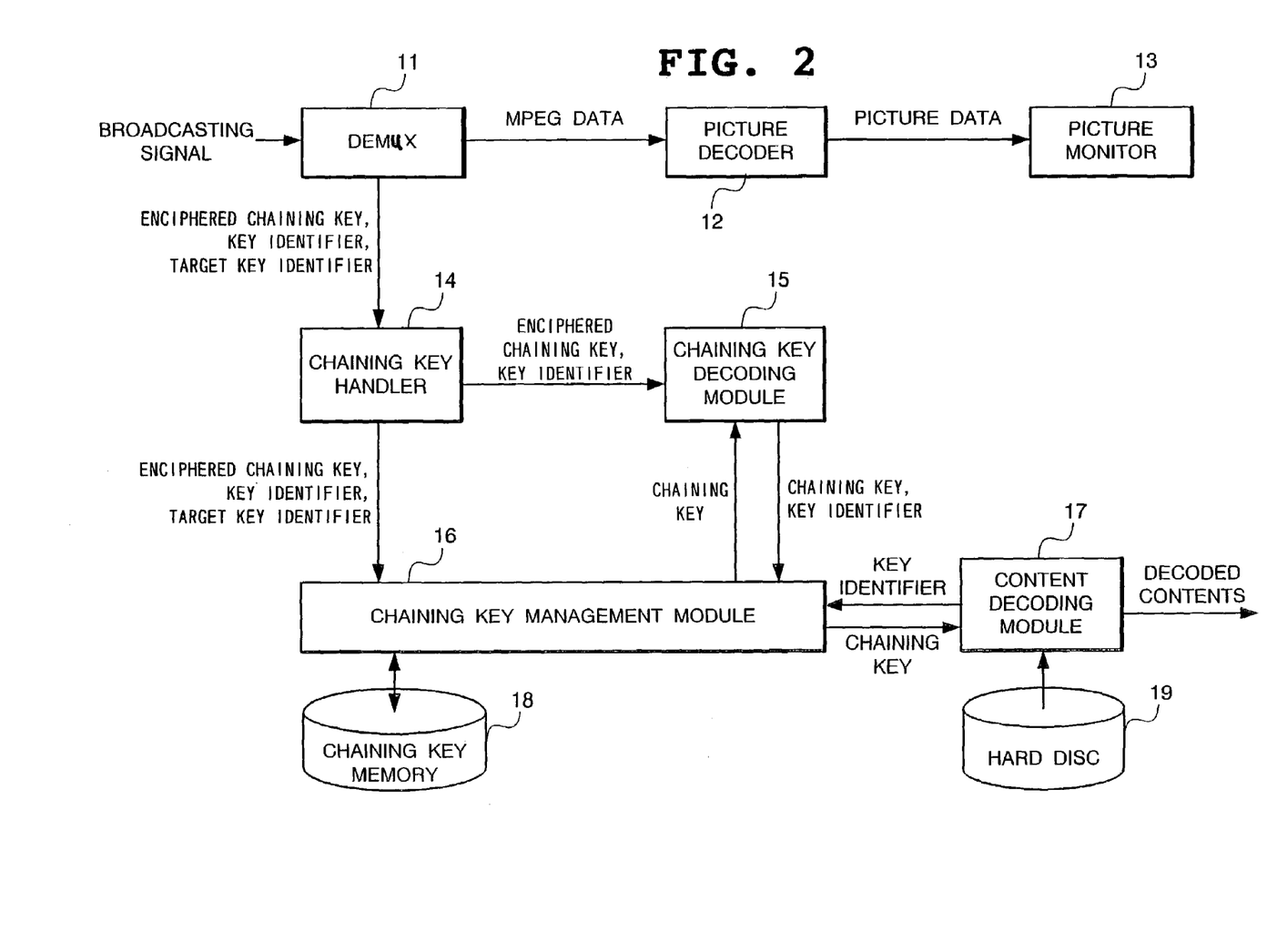
FIG. 2 is a block diagram showing a structure of a chaining key broadcasting system according to one embodiment of the present invention.

FIG. 2 is a block diagram showing a structure of a chaining key broadcasting system according to one embodiment of the present invention. In FIG. 2, the chaining key broadcasting system according to the present embodiment of the present invention includes a demux 11, a picture decoder 12, a picture monitor 13, a chaining key handler 14, a chaining key decoding module 15, a chaining key management module 16, a content decoding module 17, a chaining key memory 18 and a hard disc 19.

The demux 11 receives a digital broadcasting signal and separates the digital broadcasting signal into MPEG (Moving Picture Experts Group) data such as moving picture and voice, an enciphered chaining key, a key identifier and a target key identifier.

The picture decoder 12 decodes MPEG data to generate picture data. The picture monitor 13 displays and reproduces picture data generated by the picture decoder 12 on a monitor (not shown).

Upon receiving a key identifier and an enciphered chaining key from the chaining key handler 14, the chaining key management module 16 records the enciphered chaining key as a chaining key in pairs with the key identifier at the chaining key memory 18 and upon receiving the target key identifier from the chaining key handler 14, sends a chaining key paired with the target key identifier in the chaining key memory 18 to the chaining key decoding module 15.

In addition, upon receiving a key identifier and a chaining key from the chaining key decoding module 15, the chaining key management module 16 records them in pairs in the chaining key memory and upon receiving a key identifier from the content decoding module 17, returns a chaining key paired with the key identifier in the chaining key memory 18 to the content decoding module 17. The chaining key management module 16 is equivalent to the chaining key management unit 3 in FIG. 1.

The chaining key handler 14 receives an enciphered chaining key, a key identifier and a target key identifier from the demux 11. When the target key identifier is null, the chaining key handler 14, considers that the enciphered chaining key is the first chaining key of the series, sends the enciphered chaining key together with the key identifier to the chaining key management module 16. On the other hand, when the target key identifier is not null, the chaining key handler 14, considers that the key is a second or other following enciphered chaining key, sends the target key identifier to the chaining key management module 16 and the enciphered chaining key and the key identifier to the chaining key decoding module 15. The above-described demux 11 arid chaining key handler 14 are equivalent to the chaining key reception unit shown in FIG. 1.

The chaining key handler 14 receives an enciphered chaining key, a key identifier and a target key identifier from the demux 11. When the target key identifier is null, the chaining key handler 14, considers that the enciphered chaining key is the first chaining key of the series, sends the enciphered chaining key together with the key identifier to the chaining key management module 16. On the other hand, when the target key identifier is not null, the chaining key handler 14, considers that the key is a second or other following enciphered chaining key, sends the target key identifier to the chaining key management module 16 and the enciphered chaining key and the key identifier to the chaining key decoding module 15. The above-described demax 11 and chaining key handler 14 are equivalent to the chaining key reception unit shown in FIG. 1.

The content decoding module 17 sends a key identifier to the chaining key management module 16 and decodes enciphered contents which are in the hard disc 19 by using the chaining key obtained from the chaining key management module 16 to obtain target contents (decoded contents). In the hard disc 19, enciphered contents acquired through broadcasting, communication, distribution media, etc. are stored in advance.

Figure 3:
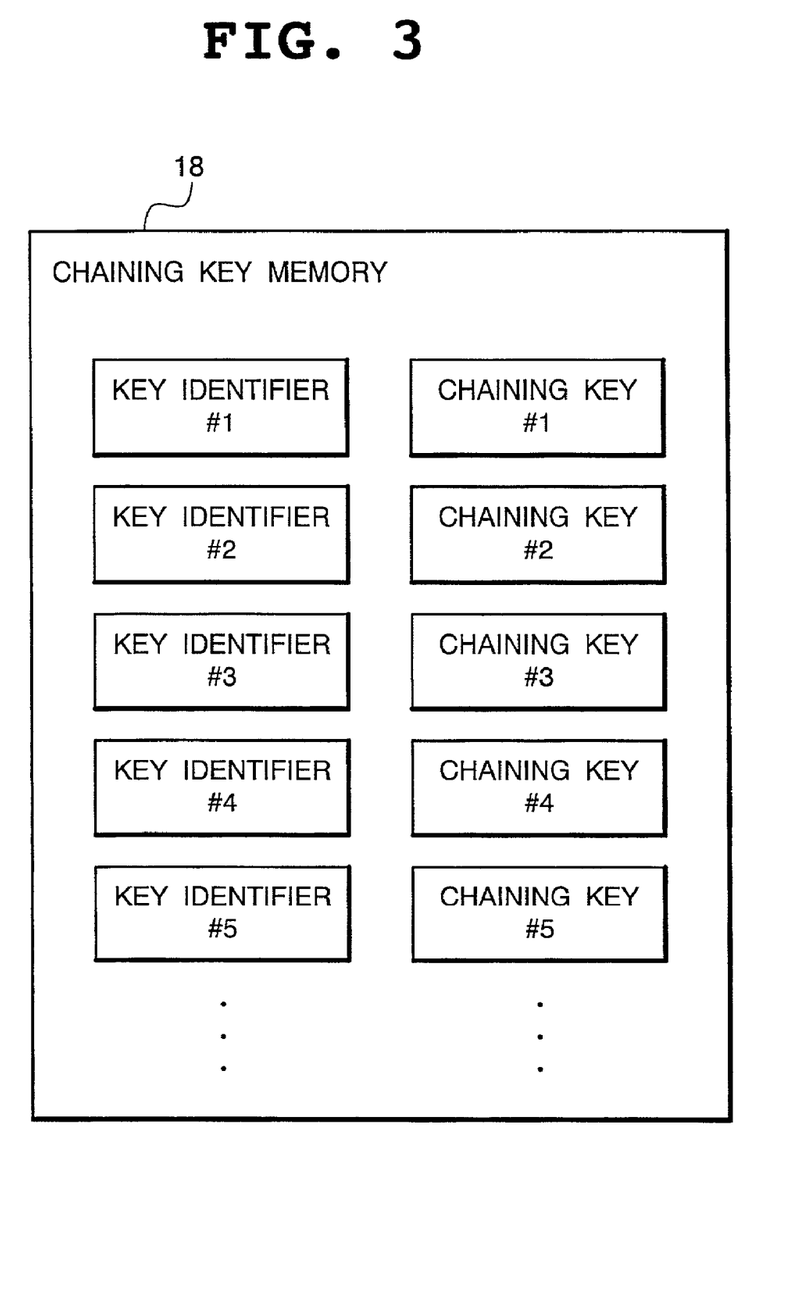
FIG. 3 is a diagram showing a structure of a chaining key memory illustrated in FIG. 2.

FIG. 3 is a diagram showing a structure of the chaining key memory 18 of FIG. 2. In FIG. 3, stored in the chaining key memory 18 are key identifiers #n (n=1, 2, 3, 4, 5, . . . ) and chaining keys #n paired with the key identifiers #n.

Figure 4:
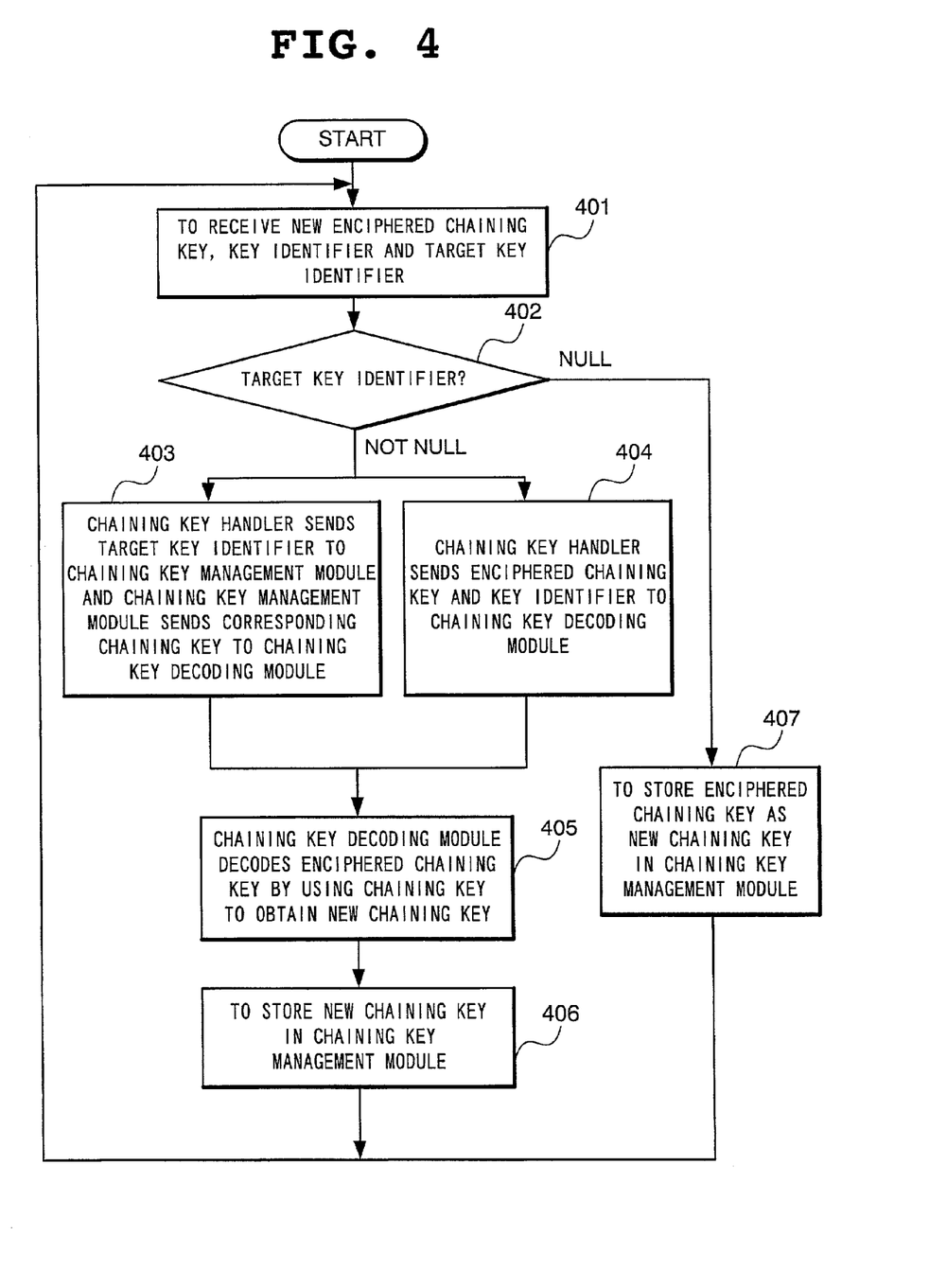
FIG. 4 is a flow chart showing chaining key generation processing of the chaining key broadcasting system according to the one embodiment of the present invention.

FIG. 4 is a flow chart showing chaining key generation processing of the chaining key broadcasting system according to the present embodiment of the present invention. With reference to FIGS. 2 to 4, description will be made of the chaining key generation processing of the chaining key broadcasting system according to the present embodiment of the present invention. In the chaining key broadcasting system according to the present embodiment of the present invention, chaining keys are sequentially generated by the chaining key handler 14, the chaining key management module 16 and the chaining key decoding module 15.

When an enciphered chaining key, a key identifier of the same and a target key identifier are applied to the chaining key handler 14 (Step 401), the chaining key handler 14 determines the target key identifier and when the target key identifier is null (Step 402), sends the key identifier and the enciphered chaining key to the chaining key management module 16, so that the chaining key management module 16 pairs them and stores the pair in the chaining key memory 18 (Step 407).

When the target key identifier is not null (Step 402), the chaining key handler 14 obtains a new chaining key from the enciphered chaining key in a manner as described below, so that the chaining key management module 16 stores the obtained key in the chaining key memory 18 (Step 406).

The procedure of obtaining a new chaining key from the enciphered chaining key is as follows. First, the chaining key handler 14 sends the target key identifier to the chaining key management module 16 and the chaining key management module 16 sends a chaining key paired with the target key identifier to the chaining key decoding module 15 (Step 403). At the same time, the chaining key handler 14 sends the key identifier and the enciphered chaining key to the chaining key decoding module 15 (Step 404).

The chaining key decoding module 15 decodes the enciphered chaining key obtained by the chaining key handler 14 with the chaining key obtained from the chaining key management module 16 to obtain a new chaining key (Step 405). The chaining key decoding module 15 sends the new chaining key and a key identifier obtained from the chaining key management module 16 to the chaining key management module 16, so that the chaining key management module 16 stores them in pairs in the chaining key memory 18 (Step 406).

Figure 5:
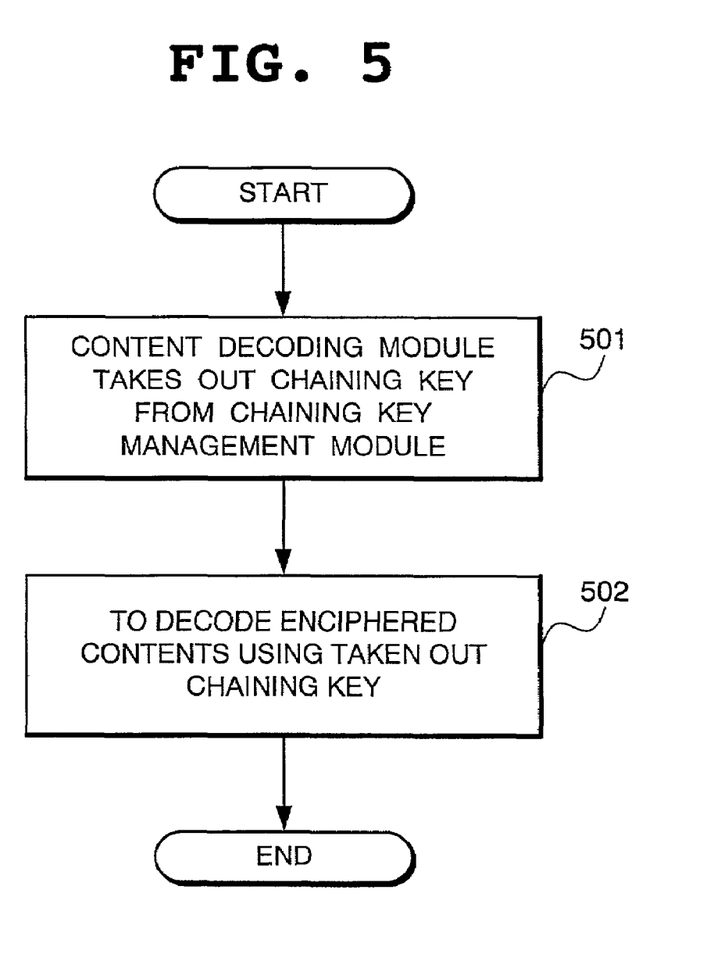
FIG. 5 is a flow chart showing decoding processing of enciphered contents in the chaining key broadcasting system according to the one embodiment of the present invention.

FIG. 5 is a flow chart showing enciphered contents decoding processing of the chaining key broadcasting system according to the present embodiment of the present invention. With reference to FIGS. 2, 3 and 5, description will be made of enciphered contents decoding processing of the chaining key broadcasting system according to the present embodiment of the present invention. In the chaining key broadcasting system according to the present embodiment of the present invention, enciphered contents are decoded using a chaining key by the content decoding module 17 and the chaining key management module 16.

In this case, the content decoding module 17 designates a key identifier to take out a chaining key from the chaining key management module 16 (Step 501). The content decoding module 17 decodes the enciphered contents using the chaining key obtained from the chaining key management module 16 (Step 502).

By thus sequentially decoding a subsequently received key with a key received last time, only a viewer who has viewed a program from the beginning to the end or who has viewed the whole of a serial drama to receive all of a series of keys is allowed to obtain a final key. For example, it is possible to realize such broadcasting service as enabling desired contents to be decoded and obtained.

In addition, by independently executing a series of processing of receiving, decoding and storing a chaining key and such processing using the chaining key, e.g. enciphered contents decoding processing, even when key reception, decoding or storage of no chaining key is conducted (e.g. when no program is viewed), decoding of enciphered contents stored in a storage medium or the like using the key is enabled.

Moreover, designation of an identifier of an arbitrary chaining key as a target identifier eliminates the need of sequential broadcasting of chaining keys. For example, by broadcasting a chaining key A in a program A, setting a target key identifier of a chaining key B to be sent in a program B to be the chaining key A and setting a target key identifier of a chaining key C to be sent in a program C also to be the chaining key A, flexible execution of such service is enabled as allowing a viewer of the program A and the program B to obtain the chaining key B and a viewer of the program A and the program C to obtain the chaining key C. It is therefore possible to realize processing which uses a decoded key for the subsequent decoding.

As described in the foregoing, according to the present invention, in a chaining key broadcasting reception system for receiving digital broadcasts, obtaining key information for decoding contents enciphered in advance based on key information obtained when a plurality of programs are viewed in digital broadcasting leads to realization of processing which uses a decoded key for the subsequent decoding.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A chaining key broadcasting reception system, comprising:

a chaining key reception unit, the chaining key reception unit configured to receive i) a first chaining key to decode, ii) a key identifier identifying the first chaining key, and iii) a target key identifier identifying a second chaining key for decoding the first chaining key;

a chaining key decoding unit receiving, as input, the first chaining key; and a chaining key management unit in bi-directional communication with the chaining key decoding unit, the chaining key management unit configured to retrieve a stored second chaining key paired with a stored key identifier matching the target key identifier and then send the retrieved second chaining key to the chaining key decoding unit, wherein, the chaining key decoding unit decodes the first chaining key using the retrieved second chaining key and the chaining key management unit stores the decoded first chaining key paired with the key identifier in a pair.

2. The system of claim 1, wherein, the chaining key reception unit comprises a demux, the chaining key management unit comprises a chaining key management module, and the chaining key decoding unit comprises a chaining key decoding module.

3. A chaining key broadcasting reception system, comprising:

a chaining key handler (14) having a first key handler output and a second key handler output;

a chaining key decoding module (15) connected to the first key handler output;

a chaining key management module (16) in bi-directional communication with the chaining key decoding module and connected to the second key handler output;

a content decoding module (17) in bi-directional communication with the chaining key management module and with a decoded contents output; and a chaining key memory (18) in bi-directional communication with the chaining key management module and storing a series of chaining key and key identifier pairs, the chaining key management module configured to i) receive, from the chaining key handler, a first key identifier and an enciphered first chaining key, ii) receive a target key identifier from the chaining key handler, and send a first stored chaining key paired with the received target key identifier from the chaining key memory to the chaining key decoding module, iii) receive from the chaining key decoding module a second key identifier arid a second chaining key, and the chaining key management module recording the second key identifier and the second chaining key as a second additional pair in the series of chaining key and key identifier pairs in the chaining key memory, and iv) receive a third key identifier from the content decoding module, and send, from the chaining key memory, a second stored chaining key paired with the third key identifier, to the content decoding module.

4. The system of claim 3, further comprising:

the chaining key handler is connected to receive the enciphered chaining key, the key identifier and the target key identifier as input, the chaining key handler is configured i) so the target key identifier being null indicates that the enciphered chaining key is a first chaining key of a series and to send the enciphered chaining key together with the key identifier to the chaining key management module, and ii) so the target key identifier being non-null indicates that the enciphered chaining key is a second or other following enciphered chaining key and to send the target key identifier to the chaining key management module and to send the enciphered chaining key and the key identifier to the chaining key decoding module.

5. The system of claim 3, wherein, a demux connects to the chaining key handler to form a chaining key reception unit, the chaining key management module is a chaining key management unit, and the chaining key decoding module is a chaining key decoding unit.

6. The system of claim 5, wherein, the chaining key decoding module i) receives, from the chaining key handler, the enciphered first chaining key, ii) obtains a new chaining key by decoding the received enciphered first chaining key using the first stored chaining key received from the chaining key management module, and iii) sends the new chaining key together with another key identifier to the chaining key management module, and the content decoding module sends a further key identifier to the chaining key management module to solicit a decoding chaining key paired with the further key identifier and stored in the chaining key memory, the decoding chaining key being to enable decoding of enciphered contents by using the new chaining key obtained from the chaining key management module.

7. A method of decoding content in a chaining key broadcasting reception system, comprising:

a step of receiving a first enciphered chaining key to decode, a key identifier identifying the first enciphered changing key, and a target key identifier identifying a second chaining key for decoding the first enciphered chaining key;

a step of retrieving a stored second chaining key paired with a stored key identifier matching the target key identifier; and a step of decoding the first enciphered chaining key using the retrieved second chaining key and storing the decoded first chaining key paired with the key identifier in a pair.

8. The method of claim 7, wherein, a final chaining key required to decode an enciphered digital broadcast is decoded only after receiving a series of chaining keys, the series of chaining keys being sent as part of a program supplied by a broadcast provider so that a broadcast provider limits the decoding of the enciphered digital broadcast to a viewer who has viewed a program supplied by the broadcast provider from a program beginning to a program end or to another viewer who has viewed a serial program supplied by a broadcasting station of the broadcast provider.

* * * * *